United States Patent
Xing et al.

(10) Patent No.: US 11,704,505 B2
(45) Date of Patent: Jul. 18, 2023

(54) LANGUAGE PROCESSING METHOD AND DEVICE

(71) Applicant: Huawei Technologies Co., Ltd., Shenzhen (CN)

(72) Inventors: Chao Xing, Beijing (CN); Xiao Chen, Hong Kong (CN); Zhenlin Cai, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 339 days.

(21) Appl. No.: 16/907,783

(22) Filed: Jun. 22, 2020

(65) Prior Publication Data

US 2020/0320255 A1  Oct. 8, 2020

Related U.S. Application Data (63) Continuation of application No. PCT/CN2018/102498, filed on Aug. 27, 2018.

(30) Foreign Application Priority Data

Dec. 23, 2017  (CN) .......................... 201711411206.3

(51) Int. Cl.
*G06F 40/58* (2020.01)
*G06F 40/51* (2020.01)
(Continued)

(52) U.S. Cl.
CPC ............ *G06F 40/58* (2020.01); *G06F 40/263* (2020.01); *G06F 40/30* (2020.01); *G06F 40/51* (2020.01); *G06F 40/55* (2020.01)

(58) Field of Classification Search
CPC ........ G06F 40/58; G06F 40/263; G06F 40/30; G06F 40/51; G06F 40/55; G06F 17/2872; G06F 17/30657
See application file for complete search history.

(56) References Cited

U.S. PATENT DOCUMENTS

| 6,345,243 | B1* | 2/2002 | Clark | ...................... G06F 40/47 |
| | | | | 704/7 |
| 2003/0233226 | A1* | 12/2003 | Kim | ...................... G06F 40/242 |
| | | | | 704/4 |

(Continued)

FOREIGN PATENT DOCUMENTS

| CN | 1567297 A | 1/2005 |
| CN | 102207938 A | 10/2011 |

(Continued)

*Primary Examiner* — Pierre Louis Desir
*Assistant Examiner* — Keisha Y. Castillo-Torres
(74) *Attorney, Agent, or Firm* — Conley Rose, P.C.

(57) ABSTRACT

A method includes obtaining n pairs of translation sentences of a source language and a target language, where each of the n pairs of translation sentences includes a source language sentence and a target language sentence that are translations of each other, extracting a source language segment from each source language sentence in the n pairs of translation sentences using an extraction rule of the source language, extracting a target language segment from each target language sentence in the n pairs of translation sentences, and generating an extraction rule of the target language based on n target language segments extracted from n target language sentences.

20 Claims, 3 Drawing Sheets

(51) Int. Cl.
 *G06F 40/263* (2020.01)
 *G06F 40/55* (2020.01)
 *G06F 40/30* (2020.01)

(56) References Cited

U.S. PATENT DOCUMENTS

| | | | |
|---|---|---|---|
| 2007/0094006 A1 | 4/2007 | Todhunter et al. | |
| 2011/0202334 A1* | 8/2011 | Abir | G06F 40/55 704/4 |
| 2013/0030787 A1* | 1/2013 | Cancedda | G06F 40/44 704/2 |
| 2014/0012564 A1* | 1/2014 | Hwang | G06F 40/44 704/4 |
| 2015/0178271 A1* | 6/2015 | Selegey | G06F 40/45 704/9 |

FOREIGN PATENT DOCUMENTS

| | | |
|---|---|---|
| CN | 103246641 A | 8/2013 |
| CN | 104239290 A | 12/2014 |
| CN | 104391842 A | 3/2015 |
| CN | 104572634 A | 4/2015 |
| CN | 105446958 A | 3/2016 |

* cited by examiner

LANGUAGE PROCESSING METHOD AND DEVICE

CROSS-REFERENCE TO RELATED APPLICATIONS

This application is a continuation of International Patent Application No. PCT/CN2018/102498 filed on Aug. 27, 2018, which claims priority to Chinese Patent Application No. 201711411206.3 filed on Dec. 23, 2017, both of which are hereby incorporated by reference in their entireties.

TECHNICAL FIELD

Embodiments of this application relate to the field of computer technologies, and in particular, to a language processing method and device.

BACKGROUND

With continuous development of artificial intelligence technologies, a natural language human-computer interaction system that allows a person to interact with a computer using a natural language becomes increasingly important. To allow the person to interact with the computer using the natural language, the system needs to be able to recognize a specific meaning of the human natural language. The system usually recognizes a specific meaning of a sentence by extracting key information from the sentence in the natural language.

In related technologies, key information in a sentence in a natural language is extracted using an extraction rule that is summarized by a language expert with respect to the natural language. For example, with respect to extracting a date from a Chinese sentence, a date extraction rule summarized by a language expert is [four-digit numeral] year [one-digit or two-digit numeral] month [one-digit or two-digit numeral] day. The system can extract key information of the date in the sentence according to the date extraction rule. When the system needs to recognize a plurality of natural languages, because of a grammar difference between different natural languages, one extraction rule cannot be applied to all natural languages. For each natural language, a language expert of the natural language needs to summarize a corresponding extraction rule.

When extraction rules of a plurality of natural languages are required, for each natural language, a corresponding language expert needs to summarize an extraction rule. This consumes excessive time and labor.

SUMMARY

This application provides a language processing method and device, to resolve a problem that, when extraction rules of a plurality of natural languages are required, consumption of time and labor is excessively large because for each natural language, a corresponding language expert needs to summarize an extraction rule.

According to a first aspect, this application provides a language processing method, where the method includes obtaining n pairs of translation sentences of a source language and a target language, where each of the n pairs of translation sentences includes a source language sentence and a target language sentence that are translations of each other, and n is an integer greater than 1, extracting a source language segment from each source language sentence in the n pairs of translation sentences using an extraction rule of the source language, extracting a target language segment from each target language sentence in the n pairs of translation sentences, where the target language segment and the source language segment are translations of each other, and generating an extraction rule of the target language based on at least n target language segments extracted from n target language sentences.

In a solution provided in this application, the at least n target language segments are extracted using the extraction rule of the source language and the n pairs of translation sentences of the source language and the target language. Then, the extraction rule of the target language is generated based on the at least n target language segments. The extraction rule of the target language can be automatically generated based on the determined extraction rule of the source language. The extraction rule of the target language does not need to be summarized by a language expert, and therefore labor and time costs are reduced.

In a possible design, extracting a target language segment from each target language sentence in the n pairs of translation sentences, where the target language segment and the source language segment are translations of each other includes, for each pair of translation sentences, obtaining, based on a word alignment relationship between the pair of translation sentences, translated words that are in a target language sentence in the pair of translation sentences and that are corresponding to words included in a source language segment extracted from a source language sentence in the pair of translation sentences, and arranging the translated words to obtain a target language segment of the target language sentence in the pair of translation sentences.

In the solution provided in this application, the target language segment of the target language sentence in the pair of the translation sentences is accurately obtained based on the word alignment relationship between the pair of the translation sentences and the source language segment.

In another possible design, each target language segment includes words of k domains, and k is a positive integer, and generating an extraction rule of the target language based on at least n target language segments extracted from n target language sentences includes combining words that belong to a same domain and that are in the at least n target language segments, to obtain combined words of each domain, where the words belonging to the same domain are words that have a same semantic meaning, and generalizing the combined words of each domain to obtain the extraction rule of the target language.

In the solution provided in this application, the extraction rule of the target language is automatically generated by combining and generalizing the words that belong to the same domain and that are in the at least n target language segments.

In still another possible design, after generating an extraction rule of the target language based on at least n target language segments extracted from n target language sentences, the method further includes applying the extraction rule of the source language to a source language corpus to obtain M source language segments, and applying the extraction rule of the target language to a target language corpus to obtain b target language segments, where a quantity of source language sentences included in the source language corpus is the same as a quantity of target language sentences included in the target language corpus, the source language sentences and the target language sentences are translations of each other, and both a and b are integers, detecting whether the M source language segments and the b target language segments meet a preset condition, and updating the extraction rule of the target language if the preset condition is met.

In the solution provided in this application, the extraction rule of the target language is updated, to ensure accuracy of the extraction rule of the target language, thereby avoiding an error when information is extracted according to the extraction rule of the target language.

In still another possible design, the preset condition includes a and b are not equal, and/or a semantic mismatch exists in at least one pair of a source language segment and a target language segment that are extracted from a pair of translation sentences.

In the solution of this application, whether the extraction rule of the target language is accurate can be accurately detected using the preset condition.

In still another possible design, the extraction rule of the target language includes an extraction rule corresponding to at least one domain, and an extraction rule corresponding to each domain is used to extract words of the target language that have a same semantic meaning, and the updating the extraction rule of the target language includes decreasing a generalization degree of an extraction rule, corresponding to a first domain, in the extraction rule of the target language, and/or increasing a generalization degree of an extraction rule, corresponding to a second domain, in the extraction rule of the target language.

In the solution provided in this application, the extraction rule of the target language is accurately updated by decreasing or increasing the generalization degree of the extraction rule of the target language, to ensure accuracy of the extraction rule of the target language.

According to a second aspect, this application provides a language processing device, where the device includes units or approaches for executing the language processing method according to any one of the first aspect or the possible designs of the first aspect.

According to a third aspect, this application provides a language processing device, where the device includes a processor and a memory. The memory stores a computer readable program. The processor executes the program in the memory to implement the language processing method according to any one of the first aspect or the possible designs of the first aspect.

According a fourth aspect, this application provides a computer storage medium configured to store a computer software instruction used by a language processing device. The computer software instruction includes a program designed for executing the foregoing aspects.

According to a fifth aspect, this application provides a computer program product. When running, the computer program product is used to perform the language processing method according to any one of the first aspect or the possible designs of the first aspect.

According to a sixth aspect, this application provides a chip, where the chip includes a programmable logic circuit and/or a program instruction. When running, the chip is configured to implement the language processing method according to any one of the first aspect or the possible designs of the first aspect.

According to a seventh aspect, this application provides a processing apparatus, where the processing apparatus includes at least one circuit, and the at least one circuit is configured to perform the language processing method according to any one of the first aspect or the possible designs of the first aspect.

According to an eighth aspect, this application provides a processing apparatus, where the processing apparatus is configured to implement the language processing method according to any one of the first aspect or the possible designs of the first aspect.

Compared with other approaches, in the solution provided in this application, the at least n target language segments are extracted using the extraction rule of the source language and the n pairs of translation sentences of the source language and the target language. Then, the extraction rule of the target language is generated based on the at least n target language segments. The extraction rule of the target language can be automatically generated based on the determined extraction rule of the source language. The extraction rule of the target language does not need to be summarized by a language expert, and therefore labor and time costs are reduced.

DESCRIPTION OF EMBODIMENTS

To make the objectives, technical solutions, and advantages of this application clearer, the following further describes implementations of this application in detail with reference to the accompanying drawings.

In a method provided in embodiments of this application, an execution body of each step may be a computer device. For example, the computer service may be a personal computer (PC) or a server. When acting as the execution body of the method provided in the embodiments of this application, the computer device may also be referred to as a language processing device. Optionally, the computer device includes a database, and the database stores corpora and extraction rules of a plurality of natural languages. For ease of description, the following method embodiments are described using only an example in which an execution body of each step is a computer device. However, this does not constitute a limitation thereon.

Figure 1:
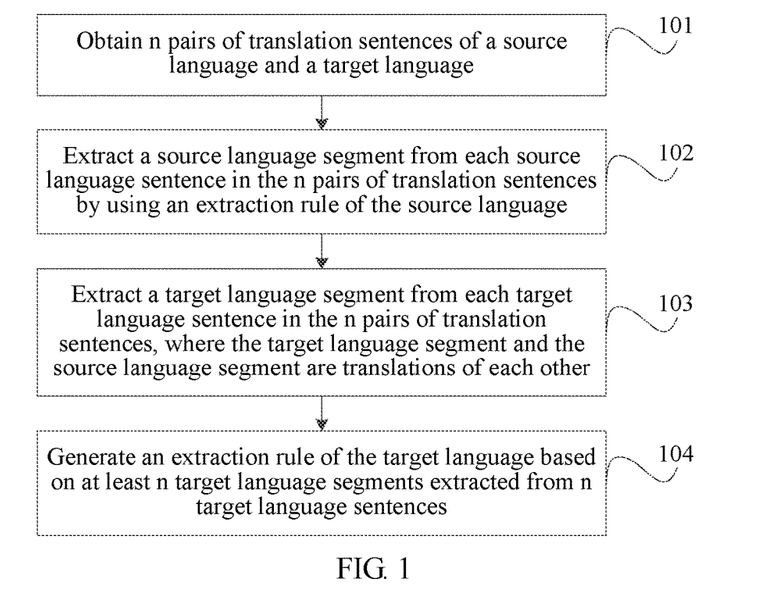
FIG. 1 is a flowchart of a language processing method according to an embodiment of this application.

FIG. 1 is a flowchart of a language processing method according to an embodiment of this application. The method may include the following several steps.

Step 101. Obtain n pairs of translation sentences of a source language and a target language.

Figure 2:
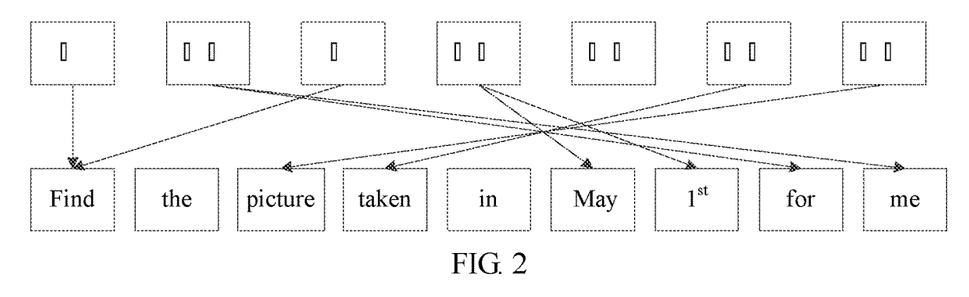
FIG. 2 is a schematic diagram of a word alignment relationship according to an embodiment of this application.

The source language is a natural language for which one or more extraction rules have been summarized, and the target language is a natural language for which an extraction rule needs to be generated. When a computer device needs to generate an extraction rule of the target language, the computer device first obtains the n pairs of translation sentences of the source language and the target language, where n is an integer greater than 1. The pair of translation sentences of the source language and the target language is a pair of a source language sentence and a target language sentence that are translations of each other. Optionally, words in a pair of translation sentences are also translations of each other, and a correspondence between words that are translations of each other in a pair of translation sentences is referred to as a word alignment relationship. For example, FIG. 2 shows a pair of translation sentences of a source language and a target language. A source language sentence is "请帮我搜五一期间拍的照片,". A corresponding target language sentence is "Find the picture taken in May 1$^{st}$ for me". Words in the pair of translation sentences are also translations of each other, for example, "搜" and "Find" are translations of each other, "照片" and "picture" are translations of each other, and "我" and "me" are translations of each other.

In a possible implementation, the computer device obtains a source language corpus and a target language corpus. A quantity of source language sentences included in the source language corpus is the same as a quantity of target language sentences included in the target language corpus, and the source language sentences and the target language sentences are translations of each other. That is, the source language corpus and the target language corpus include a plurality of pairs of translation sentences, and the plurality of translation sentences include the n pairs of translation sentences.

In another possible implementation, the computer device directly obtains the n pairs of translation sentences of the source language and the target language. The computer device stores a correspondence between an extraction rule of the source language and different translation sentences in a source language corpus and a target language corpus. The computer device can directly obtain, based on the correspondence, the n pairs of translation sentences corresponding to one extraction rule.

Optionally, the computer device can determine a word alignment relationship in the n pairs of translation sentences using a word alignment model. The computer device may determine a word alignment relationship between each pair of translation sentences using an International Business Machines Corporation (IBM) model, or may determine a word alignment relationship between each pair of translation sentences using an attention model. A specific type of the word alignment model used by the computer device is not limited in this embodiment of this application.

In a possible implementation, the computer device determines the word alignment relationship in the n pairs of translation sentences using only one word alignment model.

In another possible implementation, the computer device determines the word alignment relationship in the n pairs of translation sentences using a plurality of word alignment models. For one pair of translation sentences, the computer device first obtains word alignment relationships that are respectively determined by the plurality of word alignment models, and then selects, based on weight ratios of the plurality of word alignment models, one word alignment relationship from the word alignment relationships, as a word alignment relationship between the pair of translation sentences.

Step 102. Extract a source language segment from each source language sentence in the n pairs of translation sentences using an extraction rule of the source language.

All source language sentences in the n pairs of translation sentences correspond to the same extraction rule of the source language. The computer device extracts the source language segment of each source language sentence from the source language sentences in the n pairs of translation sentences using the extraction rule. For example, an extraction rule of month information in the source language corresponds to source language sentences in two pairs of translation sentences. The source language sentences in the two pairs of translation sentences are "Today is in May" and "Tomorrow is in May or June". In this case, a source language segment extracted by the computer device from "Today is in May" according to a month extraction rule of the source language is "May", and source language segments extracted by the computer device from "Tomorrow is in May or June" according to the month extraction rule of the source language are "May" and "June".

Optionally, an extraction rule of a language may have a plurality of expression models, for example, a sequence-to-sequence model and a regular rule-based model. A type of the expression model is not limited in this embodiment of this application.

Step 103. Extract a target language segment from each target language sentence in the n pairs of translation sentences, where the target language segment and the source language segment are translations of each other.

A source language segment is a set including a plurality of words. A source language sentence and a target language sentence in a pair of translation sentences are translations of each other, and words in a pair of translation sentences are also translations of each other. Therefore, after extracting a source language segment, the computer device can extract a target language segment from a target language sentence in a pair of translation sentences, where the target language segment and the source language segment are translations of each other. For each target language sentence in the n pairs of translation sentences, the computer device can extract the target language segment of the target language sentence.

Optionally, for each pair of translation sentences, a computer obtains, based on a word alignment relationship between the pair of translation sentences, translated words that are in a target language sentence in the pair of translation sentences and that are corresponding to words included in a source language segment extracted from a source language sentence in the pair of translation sentences. Then, the computer device arranges the translated words in an order of the words in the target language to obtain a target language segment of the target language sentence in the pair of translation sentences. For example, in a pair of translation sentences, a source language sentence is "到下午五点开始打开免打扰", and a target language sentence is "Set no disturbing at 5 p.m.". A source language segment extracted by the computer device from the source language sentence using an extraction rule of time information is "下午五点". According to a word alignment relationship, translated words that are in the target language sentence and that are corresponding to "下午五点" are "5" and "p.m.". The computer device arranges the translated words "5" and "p.m." to obtain a target language segment "5 p.m.".

Step 104. Generate an extraction rule of the target language based on at least n target language segments extracted from n target language sentences.

In one pair of translation sentences, for one extraction rule of the source language, a quantity of source language segments is the same as a quantity of target language segments. In addition, the computer device may extract more than one source language segment from a source language sentence in one pair of translation sentences according to one extraction rule of the source language.

Therefore, the computer device extracts the at least n target language segments from the n target language sentences.

At least n source language segments corresponding to the at least n target language segments are extracted by the computer device according to a same extraction rule of the source language. Therefore, the at least n target language segments correspond to a same extraction rule of the target language. The extraction rule of the target language corresponds to the extraction rule of the source language used by the computer device to extract the source language segment. Therefore, the computer device can generate, based on the at least n target language segments, the extraction rule of the target language corresponding to the at least n target language segments.

Optionally, step 104 may include the following sub-steps.

1. Combine words that belong to a same domain and that are in the at least n target language segments, to obtain combined words of each domain.

Each target language segment includes words of k domains, and k is a positive integer. Different domains represent different semantic meanings, and the words belonging to the same domain are words that have a same semantic meaning. The computer device combines the words that belong to the same domain and that are in the at least n target language segments, into a set. The set includes combined words of the domain. The target language segment includes words of k domains, and therefore the words are combined into k sets. For example, three target language segments are "5 p.m.", "11 p.m.", and "6 a.m.". In this case, the computer device combines "5", "11", and "6" as words belonging to a same domain, into a set [5, 11, or 6], and combines "p.m.", "p.m.", and "a.m." as words belonging to a same domain, into a set [p.m., p.m., or a.m.]. It should be noted that "or" in the set may be replaced by another symbol, such as "|".

2. Generalize the combined words of each domain to obtain the extraction rule of the target language.

After obtaining the combined set, the computer device determines, based on an expression model representing the extraction rule of the source language, a grammatical rule required for generating the extraction rule of the target language. The grammatical rule is a grammatical rule of the expression model. For example, if the expression model representing the extraction rule of the source language is a regular rule-based model, the grammatical rule is a regular-expression grammatical rule. The regular-expression grammatical rule includes using a preset symbol to replace an original character in words.

For example, grammatical rules of an expression model are shown in Table-1 below.

TABLE-1

| Symbol | Represented meaning |
|---|---|
| [:alpha:] | Represent any English lowercase and uppercase characters, namely, A to Z, and a to z |
| [:xdigit:] | Represent a hexadecimal digit type |
| [:alnum:] | Represent English lowercase and uppercase characters and numerals |
| [:digit:] | Represent numerals, namely, 0 to 9 |
| [:lower:] | Represent lowercase characters, namely, a to z |
| [:upper:] | Represent uppercase characters, namely, A to Z |
| [:punct:] | Represent punctuation |

The computer device may generalize the combined words based on the grammatical rules shown in Table-1, for example, use [:alpha:] to represent an English character. The grammatical rules of the expression model shown in Table-1 are merely some grammatical rules, are merely examples and illustrative, and impose no limitation on this application.

The computer device generalizes the combined words according to the grammatical rule, to obtain the extraction rule of the target language. For example, [one-digit or two-digit Arabic numeral] is obtained by generalizing [5, 11, or 6], and [p.m. or a.m.] is obtained by generalizing [p.m., p.m., or a.m.]. In this example, the extraction rule of the target language is [one-digit or two-digit Arabic numeral] [p.m. or a.m.]. It should be noted that in this embodiment of this application, for ease of description, the extraction rule is merely represented using a Chinese character or an English character. In actual application, for different expression models, extraction rule representation forms are also different. For example, in a regular rule-based model, d{1} may be used to represent a one-digit Arabic numeral, and a symbol "|" may be used to represent "or".

In the solution provided in this embodiment of this application, the at least n target language segments are extracted using the extraction rule of the source language and the n pairs of translation sentences of the source language and the target language. Then, the extraction rule of the target language is generated based on the at least n target language segments. The extraction rule of the target language can be automatically generated based on the determined extraction rule of the source language. The extraction rule of the target language does not need to be summarized by a language expert, and therefore labor and time costs are reduced.

After generating the extraction rule of the target language, the computer device may further detect whether the generated extraction rule of the target language is accurate. When the extraction rule of the target language is inaccurate, the computer device updates the extraction rule of the target language.

Figure 3:
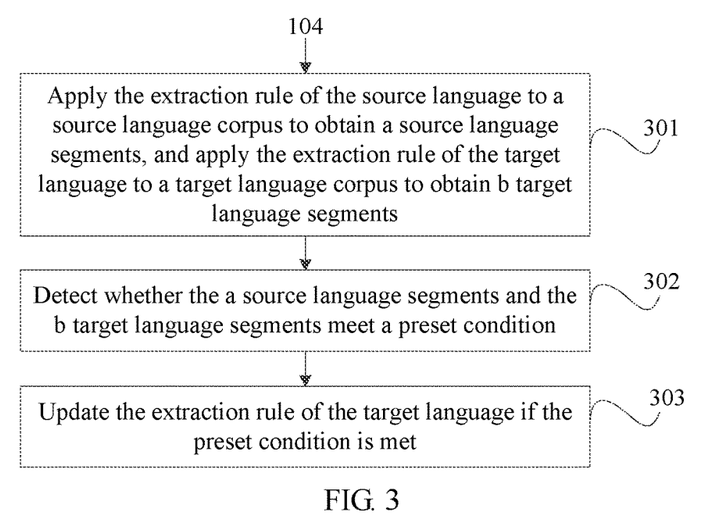
FIG. 3 is a flowchart of a language processing method according to another embodiment of this application.

In an optional embodiment provided based on the embodiment shown in FIG. 1, as shown in FIG. 3, after step 104, the following steps are further included. In this embodiment, an updating manner of the extraction rule of the target language is described.

Step 301. Apply the extraction rule of the source language to a source language corpus to obtain M source language segments, and apply the extraction rule of the target language to a target language corpus to obtain b target language segments.

Figure 4:
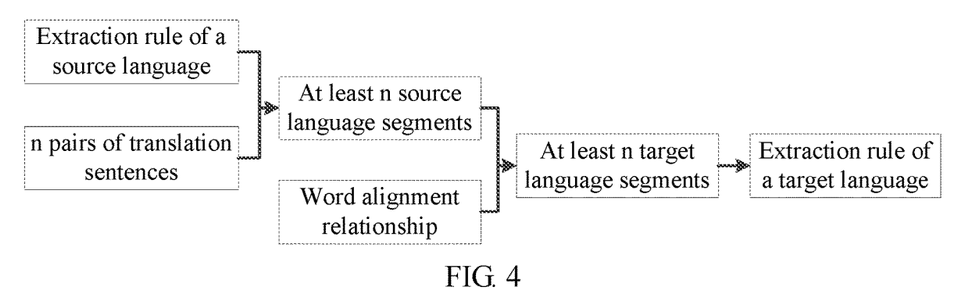
FIG. 4 is a schematic diagram of generating an extraction rule of a target language according to an embodiment of this application.

Referring to a schematic diagram shown in FIG. 4, the computer device extracts at least n source language segments based on the n pairs of translation sentences and according to the extraction rule of the source language, and then extracts at least n target language segments with reference to a word alignment relationship, to generate the extraction rule of the target language.

After generating the extraction rule of the target language, the computer device detects whether the generated extraction rule of the target language is accurate, to be specific, detects whether a corresponding target language segment can be accurately extracted according to the extraction rule of the target language. The computer device applies the extraction rule of the target language to the target language corpus to obtain the b target language segments. Then, the computer device applies the extraction rule of the source language to the source language corpus to obtain the M source language segments. The extraction rule of the source language is an extraction rule corresponding to the extraction rule of the target language. Both a and b are integers.

Step 302. Detect whether the M source language segments and the b target language segments meet a preset condition.

The computer device determines whether the extraction rule of the target language is accurate by detecting whether the M source language segments and the b target language segments meet the preset condition. If the preset condition is met, the extraction rule of the target language is inaccurate. If the preset condition is not met, the extraction rule of the target language is accurate, and does not need to be updated.

The preset condition includes a and b are not equal, and/or a semantic mismatch exists in at least one pair of a source language segment and a target language segment that are extracted from a pair of translation sentences. The extraction rule of the source language and the extraction rule of the target language are extraction rules corresponding to each other. A quantity of source language sentences included in the source language corpus is the same as a quantity of target language sentences included in the target language corpus, and the source language sentences and the target language sentences are translations of each other. Therefore, if the extraction rule of the target language is accurate, a quantity of the source language segments is the same as a quantity of the target language segments, and semantic meanings of each pair of a source language segment and a target language segment that are extracted from a pair of translation sentences are also the same.

Step 303. Update the extraction rule of the target language if the preset condition is met.

If the preset condition is met, it indicates that the extraction rule of the target language is inaccurate, and the computer device needs to update the extraction rule of the target language. The computer device may update the extraction rule of the target language by decreasing a generalization degree of an extraction rule, corresponding to a first domain, in the extraction rule of the target language, and/or by increasing a generalization degree of an extraction rule, corresponding to a second domain, in the extraction rule of the target language. The extraction rule of the target language includes an extraction rule corresponding to at least one domain, and an extraction rule corresponding to each domain is used to extract words of the target language that have a same semantic meaning. The first domain is a domain corresponding to the extraction rule whose generalization degree is excessively high, and the second domain is a domain corresponding to the extraction rule whose generalization degree is excessively low.

Decreasing a generalization degree of an extraction rule corresponding to a domain is decreasing, by modifying an expression form of the extraction rule, words that belong to the domain and that are extracted according to the extraction rule, to avoid extracting words not belonging to the domain. Increasing a generalization degree of an extraction rule corresponding to a domain is increasing, by modifying an expression form of the extraction rule, words that belong to the domain and that are extracted according to the extraction rule, to ensure that all words belonging to the domain can be extracted.

The computer device may modify the extraction rule of the target language by directly replicating the extraction rule of the source language. The computer device can modify the extraction rule of the target language by directly replicating the extraction rule of the source language, only when a preset symbol in a grammatical rule of an expression model is used in the extraction rule of the source language. A same expression model is used in both the extraction rule of the source language and the extraction rule of the target language. In this case, in the extraction rule of the source language and the extraction rule of the target language, preset symbols in grammatical rules of the expression model represent a same meaning such that no ambiguity is caused by a difference between the languages. Therefore, the computer device may modify the extraction rule of the target language by directly replicating the extraction rule of the source language.

The computer device may alternatively modify the extraction rule of the target language by adding a specified sentence pattern to which the extraction rule is applied. The specified sentence pattern may be a preset sentence pattern.

For example, a source language is English, a target language is Chinese, and an extraction rule is a month extraction rule. In this example, the extraction rule of the target language is [one-digit or two-digit Arabic numeral] [month]. When extracting a target language segment from a target language corpus according to the extraction rule, the computer device may extract "六月" as a month from "六月天的演唱会", but the "六月" does not represent the month. In this case, the computer device detects that "六月天" corresponds to "June Day", based on a source language sentence that is in a source language corpus and corresponds to "六月天的演唱 会". "六月" corresponds to "June", and "天" corresponds to "Day". The computer device uses a specified sentence pattern "下 ·个词语不是'天'" as a specified sentence pattern to which the extraction rule of the target language is applied, and modifies the extraction rule of the target language to [one-digit or two-digit Arabic numeral] [month] [not "Day"], to avoid extracting "六月" from "六月天".

In addition, when modifying the extraction rule of the target language, the computer device first detects whether only a preset symbol in a grammatical rule of an expression model is used in the extraction rule of the source language corresponding to the extraction rule of the target language. If yes, the extraction rule of the target language is modified by directly replicating the extraction rule of the source language, or if not, the extraction rule of the target language is modified by adding the specified sentence pattern to which the extraction rule is applied.

In a possible implementation, a is greater than b. A quantity of the source language segments is greater than a quantity of the target language segments. To be specific, when extracting the target language segments according to the extraction rule of the target language, the computer device omits some target language segments. It indicates that a generalization degree of an extraction rule, corresponding to at least one domain, in the extraction rule of the target language is excessively low. That is, the extraction rule corresponding to the second domain exists in the extraction rule of the target language. As a result, the computer device fails to extract all words belonging to the domain. In this case, the computer device needs to increase the generalization degree of the extraction rule corresponding to the domain, to ensure that all the words belonging to the domain can be extracted.

For example, a source language is Chinese, a target language is English, and an extraction rule is a month and day extraction rule. In this example, an extraction rule of the source language is [one-digit or two-digit Arabic numeral] [one-digit or two-digit Arabic numeral], and an extraction rule of the target language is [English word of a month] [two-digit Arabic numeral]. When extracting a target language segment from a target language corpus according to the extraction rule, the computer device may omit a target language segment in which a date is represented using a one-digit Arabic numeral, such as May 5. As a result, a quantity of source language segments is greater than a quantity of target language segments. The computer device needs to increase a generalization degree of an extraction rule corresponding to a domain of dates. The computer device modifies the extraction rule of the target language by directly replicating the extraction rule of the source language, and a modified extraction rule of the target language is [English word of a month] [one-digit or two-digit Arabic numeral].

In another possible implementation, a is less than b. A quantity of the source language segments is less than a quantity of the target language segments. To be specific, when extracting the target language segments according to the extraction rule of the target language, the computer device extracts an extra target language segment. It indicates that a generalization degree of an extraction rule, corresponding to at least one domain, in the extraction rule of the target language is excessively high. That is, the extraction rule corresponding to the first domain exists in the extraction rule of the target language. As a result, the computer device extracts words not belonging to the domain. In this case, the computer device needs to decrease the generalization degree of the extraction rule corresponding to the domain, to avoid extracting the words not belonging to the domain.

For example, a source language is Chinese, a target language is English, and an extraction rule is a month and day extraction rule. In this example, an extraction rule of the source language is [one-digit or two-digit Arabic numeral] [one-digit or two-digit Arabic numeral], and an extraction rule of the target language is [English word of a month] [Arabic numeral]. When extracting a target language segment from a target language corpus according to the extraction rule, the computer device may also extract a target language segment representing a year and a month in English, such as May 2000. As a result, a quantity of source language segments is less than a quantity of target language segments. The computer device needs to decrease a generalization degree of an extraction rule corresponding to a domain of dates. The computer device modifies the extraction rule of the target language by directly replicating the extraction rule of the source language, and a modified extraction rule of the target language is [English word of a month] [one-digit or two-digit Arabic numeral].

In still another possible implementation, a is equal to b, and a semantic mismatch exists in at least one pair of a source language segment and a target language segment that are extracted from a pair of translation sentences. A semantic mismatch in a pair of a source language segment and a target language segment that are extracted from a pair of translation sentences means that words in the target language segment and words in the source language segment cannot be in a one-to-one correspondence. When the words in the target language segment include a word that cannot correspond to a word in the source language segment, the computer device determines that a generalization degree of an extraction rule, corresponding to at least one domain, in the extraction rule of the target language is excessively high. That is, the extraction rule corresponding to the first domain exists in the extraction rule of the target language. The generalization degree of the extraction rule needs to be decreased. When the words in the source language segment include a word that cannot correspond to a word in the target language segment, the computer device determines that a generalization degree of an extraction rule, corresponding to at least one domain, in the extraction rule of the target language is excessively low. That is, the extraction rule corresponding to the second domain exists in the extraction rule of the target language. The generalization degree of the extraction rule needs to be increased. When the foregoing two cases occur simultaneously, the computer device determines that the extraction rule corresponding to the first domain and the extraction rule corresponding to the second domain coexist in the extraction rule of the target language. In this case, the computer device decreases the generalization degree of the extraction rule corresponding to the first domain, and increases the generalization degree of the extraction rule corresponding to the second domain.

Optionally, after updating the extraction rule of the target language, the computer device may update the extraction rule of the source language using a same updating manner. The computer device applies the extraction rule of the source language to the source language corpus to obtain M source language segments and applies the extraction rule of the target language to the target language corpus to obtain b target language segments, detects whether the M source language segments and the b target language segments meet a preset condition, and updates the extraction rule of the source language if the preset condition is met.

Optionally, after step 303, step 301 and steps subsequent to step 301 may be performed again until the M source language segments and the b target language segments do not meet the preset condition. The extraction rule of the target language is checked and updated repeatedly, to ensure accuracy of the extraction rule of the target language.

In the foregoing manner, with reference to the extraction rule of the source language, the extraction rule of the target language is detected and updated, to ensure the accuracy of the extraction rule of the target language, thereby avoiding an error when information is extracted according to the extraction rule of the target language.

In the foregoing method embodiments, the technical solutions provided in this application are described from a perspective of a language processing device. It may be understood that, to implement the foregoing functions, the language processing device includes corresponding hardware structures and/or software modules (or units) for performing the functions. Units and algorithm steps of the examples described with reference to the embodiments disclosed in this application may be implemented by hardware or a combination of hardware and computer software in the embodiments of this application. Whether a function is performed by hardware or hardware driven by computer software depends on particular applications and design constraints of the technical solutions. For each particular application, a person skilled in the art may use different methods to implement the described functions, but it should not be considered that the implementation goes beyond the scope of the technical solutions of the embodiments of this application.

In the embodiments of this application, functional unit division may be performed on the language processing device based on the method examples. For example, functional units may be divided based on corresponding functions, or two or more functions may be integrated into one processing unit. The integrated unit may be implemented in a form of hardware, or may be implemented in a form of a software functional unit. It should be noted that the unit division in the embodiments of this application is an example, and is merely logical function division. There may be another division manner in actual implementation.

Figure 5:
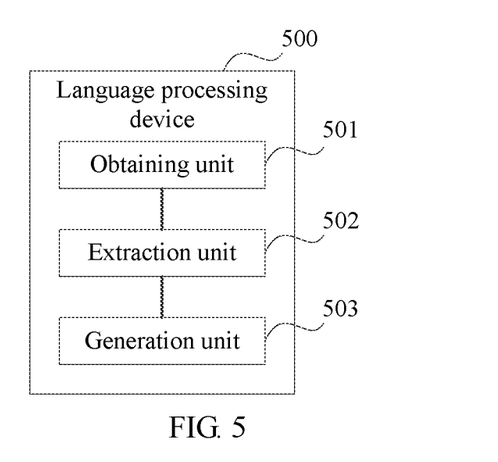
FIG. 5 is a schematic block diagram of a language processing device according to an embodiment of this application.

FIG. 5 is a structural block diagram of a language processing device 500 according to an embodiment of this application. The device includes an obtaining unit 501, an extraction unit 502, and a generation unit 503.

The obtaining unit 501 is configured to implement a step corresponding to step 101 in the foregoing method embodiment, and other explicit or implicit obtaining steps.

The extraction unit 502 is configured to implement at least one of step 102, step 103, or step 301 in the foregoing method embodiment, and other explicit or implicit extraction steps.

The generation unit 503 is configured to implement at least one of step 104, step 302, or step 303 in the foregoing method embodiment, and other explicit or implicit generation steps.

The obtaining unit 501 may be implemented by a processor, a memory, and a first instruction, a first segment of program, a code set, or an instruction set in the memory. The extraction unit 502 may be implemented by the processor, the memory, and a second instruction, a second segment of program, a code set, or an instruction set in the memory. The generation unit 503 may be implemented by the processor, the memory, and a third instruction, a third segment of program, a code set, or an instruction set in the memory.

Figure 6:
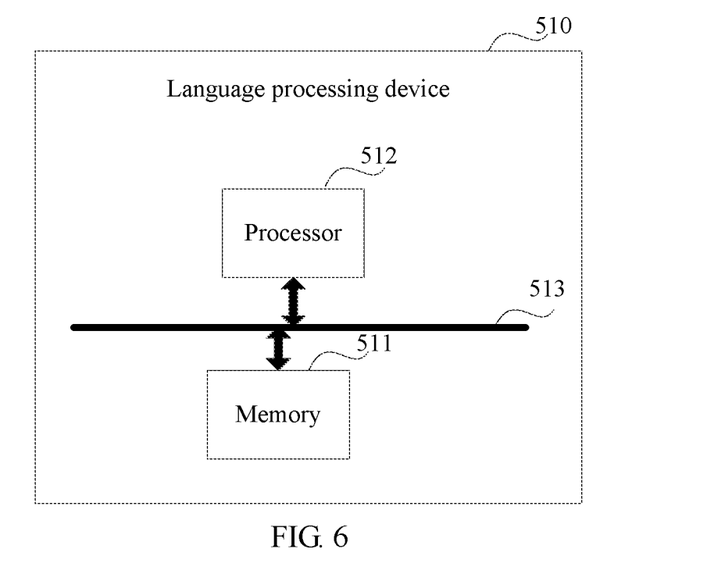
FIG. 6 is a schematic structural diagram of a language processing device according to an embodiment of this application.

Referring to FIG. 6, a language processing device 510 includes a processor 512 and a memory 511. Optionally, the language processing device 510 may further include a bus 513. The processor 512 and the memory 511 may be connected to each other using the bus 513. The bus 513 may be a Peripheral Component Interconnect (PCI) bus, an Extended Industry Standard Architecture (EISA) bus, or the like. The bus 513 may be classified into an address bus, a data bus, a control bus, and the like. For ease of representation, in FIG. 6, only one thick line is used to represent the bus. However, this does not indicate that there is only one bus or only one type of bus.

Methods or algorithm steps described with reference to the content disclosed in the embodiments of this application may be implemented by hardware, or may be implemented by a processor by executing a software instruction. The software instruction may include a corresponding software module (or unit). The software module (or unit) may be stored in a random-access memory (RAM), a flash memory, a read-only memory (ROM), an erasable programmable ROM (EPROM), an electrically EPROM (EEPROM), a register, a hard disk, a removable hard disk, a compact disc (CD) ROM (CD-ROM), or any other forms of storage media well known in the art. For example, a storage medium is coupled to the processor such that the processor can read information from the storage medium and write information into the storage medium. Certainly, the storage medium may alternatively be a constituent part of the processor. The processor and the storage medium may be located in an application-specific integrated circuit (ASIC). In addition, the ASIC may be located in the language processing device. Certainly, the processor and the storage medium may alternatively exist in the language processing device as discrete components.

A person skilled in the art should be able to be aware that in the foregoing one or more examples, the functions described in the embodiments of this application may be implemented by hardware, software, firmware, or any combination thereof. The embodiments of this application further provide a computer program product. When being executed, the computer program product is used to implement the foregoing functions. In addition, the foregoing computer program product may be stored in a computer readable medium or transmitted as one or more instructions or code in a computer readable medium. The computer readable medium includes a computer storage medium and a communications medium, and the communications medium includes any medium that allows a computer program to be easily transmitted from one place to another. The storage medium may be any available medium that can be accessed by a general-purpose or special-purpose computer.

An embodiment of this application provides a chip. The chip includes a programmable logic circuit and/or a program instruction. When running, the chip is configured to implement the language processing method provided in the foregoing embodiments.

An embodiment of this application provides a processing apparatus. The processing apparatus includes at least one circuit, and the at least one circuit is configured to perform the language processing method provided in the foregoing embodiments.

An embodiment of this application provides a processing apparatus, and the processing apparatus is configured to implement the language processing method provided in the foregoing embodiments.

In the foregoing specific implementations, the objectives, technical solutions, and beneficial effects of the embodiments of this application are further described in detail. It should be understood that the foregoing descriptions are merely specific implementations of the embodiments of this application, but are not intended to limit the protection scope of the embodiments of this application. Any modification, equivalent replacement, improvement, or the like made based on the technical solutions of the embodiments of this application shall fall within the protection scope of the embodiments of this application.

What is claimed is:

1. A language processing method implemented by a computer device using a model, the method comprising:
    obtaining n pairs of translation sentences of a source language and a target language, wherein each of the n pairs of translation sentences comprises a source language sentence and a target language sentence that is a translation sentence of the source language sentence, wherein the computer device determines a word alignment relationship using a word alignment model, and wherein n is an integer greater than one;
    extracting source language segments from n source language sentences in the n pairs of translation sentences using an extraction rule of the source language;
    extracting target language segments from n target language sentences in the n pairs of translation sentences, wherein the target language segments are translations of corresponding source language segments;
    generating, by the computer device, an extraction rule of the target language based on the target language segments;
    detecting, by the computer device, whether the extraction rule is accurate, and when the extraction rule is inaccurate, updating the extraction rule of the target language;
    applying the extraction rule of the source language to a source language corpus to obtain M source language segments, wherein M is an integer;
    applying the extraction rule of the target language to a target language corpus to obtain b target language segments, wherein a quantity of source language sentences in the source language corpus is the same as a quantity of target language sentences in the target language corpus, wherein the source language sentences in the source language corpus and the target language sentences in the target language corpus are translations of each other, and wherein b is an integer;

storing a correspondence between the extraction rule of the source language and the extraction rule of the target language;

obtaining, based on the correspondence, the n pairs of translation sentences; and updating the extraction rule of the target language when: M and b are not equal; and
   a semantic mismatch exists in a pair of a target language segment and a corresponding source language segment.

2. The language processing method of claim 1, further comprising:

obtaining, for each of the n pairs of translation sentences, translated words that are in the target language sentence and that correspond to words in a source language segment extracted from the source language sentence based on a word alignment relationship between each of the n pairs of translation sentences; and arranging the translated words to obtain the target language segments.

3. The language processing method of claim 1, wherein each of the target language segments comprises words of k domains, wherein k is a positive integer, and wherein the language processing method further comprises:

combining words that belong to a same domain and that are in the target language segments to obtain combined words of each domain, wherein the words belonging to the same domain have a same semantic meaning; and generalizing the combined words of each domain to obtain the extraction rule of the target language.

4. The language processing method of claim 1, wherein the extraction rule of the target language comprises a plurality of extraction rules corresponding to a plurality of domains, wherein each of the extraction rules is configured to extract words of the target language that have a same semantic meaning, and wherein the language processing method further comprises:

decreasing a first generalization degree of a first extraction rule, corresponding to a first domain, in the extraction rule of the target language; and increasing a second generalization degree of a second extraction rule, corresponding to a second domain, in the extraction rule of the target language.

5. A language processing computer device comprising:

a non-transitory medium configured to store program instructions; and a processor coupled to the non-transitory medium, wherein the program instructions cause the processor to be configured to implement a model to:

obtain n pairs of translation sentences of a source language and a target language, wherein each of the n pairs of translation sentences comprises a source language sentence and a target language sentence that is a translation sentence of the source language sentence, wherein the computer device determines a word alignment relationship using a word alignment model, and wherein n is an integer greater than one;

extract source language segments from n source language sentences in the n pairs of translation sentences using an extraction rule of the source language;

extract target language segment from n target language sentence in the n pairs of translation sentences, wherein the target language segments are translations of corresponding source language segments; and generate, by the computer device, an extraction rule of the target language based on the target language segments;

detect, by the computer device, whether the extraction rule is accurate, and when the extraction rule is inaccurate, updating the extraction rule of the target language;

apply the extraction rule of the source language to a source language corpus to obtain M source language segments, wherein M is an integer;

apply the extraction rule of the target language to a target language corpus to obtain b target language segments, wherein a quantity of source language sentences in the source language corpus is the same as a quantity of target language sentences in the target language corpus, wherein the source language sentences in the source language corpus and the target language sentences in the target language corpus are translations of each other, and wherein b is an integer;

store a correspondence between the extraction rule of the source language and the extraction rule of the target language;

obtain, based on the correspondence, the n pairs of translation sentences; and update the extraction rule of the target language when: M and b are not equal; and
   a semantic mismatch exists in a pair of a target language segment and a corresponding source language segment.

6. The language processing computer device of claim 5, wherein the program instructions further cause the processor to be configured to:

obtain, for each of the n pairs of translation sentences, translated words that are in the target language sentence and that correspond to words in a source language segment extracted from the source language sentence based on a word alignment relationship between each of the n pairs of translation sentences; and arrange the translated words to obtain the target language segments.

7. The language processing computer device of claim 5, wherein each of the target language segments comprises words of k domains, wherein k is a positive integer, wherein the program instructions further cause the processor to be configured to:

combine words that belong to a same domain and that are in the target language segments to obtain combined words of each domain, wherein the words belonging to the same domain have a same semantic meaning; and generalize the combined words of each domain to obtain the extraction rule of the target language.

8. The language processing computer device of claim 5, wherein the extraction rule of the target language comprises a plurality of extraction rules corresponding to a plurality of domains, wherein each of the extraction rules is configured to extract words of the target language that have a same semantic meaning, and wherein the program instructions further cause the processor to be configured to:

decrease a first generalization degree of a first extraction rule, corresponding to a first domain, in the extraction rule of the target language; or increase a second generalization degree of a second extraction rule, corresponding to a second domain, in the extraction rule of the target language.

9. A computer program product comprising computer-executable instructions for storage on a non-transitory computer-readable medium that, when executed by a processor, cause an apparatus to implement a model to:
- obtain n pairs of translation sentences of a source language and a target language, wherein each of the n pairs of translation sentences comprises a source language sentence and a target language sentence that is a translation sentence of the source language sentence, wherein the apparatus determines a word alignment relationship using a word alignment model, and wherein n is an integer greater than one;
- extract source language segments from n source language sentences in the n pairs of translation sentences using an extraction rule of the source language;
- extract target language segments from n target language sentences in the n pairs of translation sentences, wherein the target language segments are translations of corresponding source language segments;
- generate, by the apparatus, an extraction rule of the target language based on the target language segments;
- detect, by the apparatus, whether the extraction rule is accurate, and when the extraction rule is inaccurate, updating the extraction rule of the target language;
- apply the extraction rule of the source language to a source language corpus to obtain M source language segments, wherein M is an integer;
- apply the extraction rule of the target language to a target language corpus to obtain b target language segments;
- store a correspondence between the extraction rule of the source language and the extraction rule of the target language;
- obtain, based on the correspondence, the n pairs of translation sentences; and
- when M is equal to b and a semantic mismatch exists in at least one pair of a source language segment and a target language segment that are extracted from a pair of translation sentences, further cause the apparatus to:
  - determine that a generalization degree of an extraction rule corresponding to at least one domain in the extraction rule of the target language is excessively high when words in the target language segment include a word that cannot correspond to a word in the source language segment; or
  - determine that a generalization degree of an extraction rule corresponding to at least one domain in the extraction rule of the target language is excessively low when the words in the source language segment include a word that cannot correspond to a word in the target language segment; or
  - determine that the extraction rule corresponding to a first domain and the extraction rule corresponding to a second domain coexist in the extraction rule of the target language;
  - decrease the generalization degree of the extraction rule corresponding to the first domain; and
  - increase the generalization degree of the extraction rule corresponding to the second domain when the words in the target language segment include a word that cannot correspond to a word in the source language segment and simultaneously the words in the source language segment include a word that cannot correspond to a word in the target language segment.

10. A chip, wherein the chip comprises a programmable logic circuit or a program instruction, and wherein when running the programmable logic circuit or the program instruction, the chip is configured to implement a model to:
- obtain n pairs of translation sentences of a source language and a target language, wherein each of the n pairs of translation sentences comprises a source language sentence and a target language sentence that is a translation sentence of the source language sentence, wherein the chip determines a word alignment relationship using a word alignment model, and wherein n is an integer greater than one;
- extract source language segments from n source language sentences in the n pairs of translation sentences using an extraction rule of the source language;
- extract target language segments from n target language sentences in the n pairs of translation sentences, wherein the target language segments are translations of corresponding source language segments; and
- generate, by the chip, an extraction rule of the target language based on the following target language segments:
  - lower case and upper case characters a-z and A-Z;
  - hexadecimal digits;
  - characters representing numbers;
  - numerical characters 0-9;
  - lower case characters a-z
  - uppercase characters; and
  - punctuation;
- detect, by the chip, whether the extraction rule is accurate, and when the extraction rule is inaccurate, updating the extraction rule of the target language;
- store a correspondence between the extraction rule of the source language and the extraction rule of the target language; and
- obtain, based on the correspondence, the n pairs of translation sentences.

11. A processing apparatus, wherein the processing apparatus comprises at least one circuit, and wherein the at least one circuit is configured to implement a model to:
- obtain n pairs of translation sentences of a source language and a target language, wherein each of the n pairs of translation sentences comprises a source language sentence and a target language sentence that is a translation sentence of the source language sentence, wherein the processing apparatus determines a word alignment relationship using a word alignment model, and wherein n is an integer greater than one;
- extract source language segments from n source language sentences in the n pairs of translation sentences using an extraction rule of the source language;
- extract target language segments from n target language sentences in the n pairs of translation sentences, wherein a target language segment and a corresponding source language segment are translations of each other; and
- generate, by the processing apparatus, an extraction rule of the target language based on the target language segments;
- detect, by the processing apparatus, whether the extraction rule is accurate, and when the extraction rule is inaccurate, updating the extraction rule of the target language;
- apply the extraction rule of the source language to a source language corpus to obtain M source language segments, wherein M is an integer;

apply the extraction rule of the target language to a target language corpus to obtain b target language segments;

store a correspondence between the extraction rule of the source language and the extraction rule of the target language;

obtain, based on the correspondence, the n pairs of translation sentences; and when M is equal to b and a semantic mismatch exists in at least one pair of a source language segment and a target language segment that are extracted from a pair of translation sentences, further cause the apparatus to:

determine that a generalization degree of an extraction rule corresponding to at least one domain in the extraction rule of the target language is excessively high when words in the target language segment include a word that cannot correspond to a word in the source language segment; or determine that a generalization degree of an extraction rule corresponding to at least one domain in the extraction rule of the target language is excessively low when the words in the source language segment include a word that cannot correspond to a word in the target language segment; or determine that the extraction rule corresponding to a first domain and the extraction rule corresponding to a second domain coexist in the extraction rule of the target language;

decrease the generalization degree of the extraction rule corresponding to the first domain; and increase the generalization degree of the extraction rule corresponding to the second domain when the words in the target language segment include a word that cannot correspond to a word in the source language segment and simultaneously the words in the source language segment include a word that cannot correspond to a word in the target language segment.

12. A processing apparatus comprising:
a memory configured to store instructions; and
a processor coupled the memory, wherein the instructions cause the processor to be configured to implement a model to:
  obtain n pairs of translation sentences of a source language and a target language, wherein each of the n pairs of translation sentences comprises a source language sentence and a target language sentence that is a translation sentence of the source language sentence, wherein the processing apparatus determines a word alignment relationship using a word alignment model, and wherein n is an integer greater than one;
  extract source language segments from n source language sentences in the n pairs of translation sentences using an extraction rule of the source language;
  extract target language segments from n target language sentences in the n pairs of translation sentences, wherein the target language segments are translations of corresponding source language segments; and
  generate, by the processing apparatus, an extraction rule of the target language based on the target language segments comprising a date extraction rule, wherein a one-digit or two-digit numeral paired with an English word indicating a particular month is determined to indicate a date;
  detect, by the processing apparatus, whether the extraction rule is accurate, and when the extraction rule is inaccurate, updating the extraction rule of the target language;
  store a correspondence between the extraction rule of the source language and the extraction rule of the target language; and
  obtain, based on the correspondence, the n pairs of translation sentences.

13. The language processing method of claim 1, wherein the extraction rule of the target language comprises a plurality of extraction rules corresponding to a plurality of domains, wherein each of the extraction rules are configured to extract words of the target language that have a same semantic meaning, and wherein the language processing method further comprises:
  decreasing a first generalization degree of a first extraction rule, corresponding to a first domain, in the extraction rule of the target language; or
  increasing a second generalization degree of a second extraction rule, corresponding to a second domain, in the extraction rule of the target language.

14. The computer program product of claim 9, wherein the computer-executable instructions, when executed by a processor, further cause the apparatus to:
  obtain for each of the n pairs of translation sentences, translated words that are in the target language sentence and that correspond to words comprised in a source language segment extracted from the source language sentence based on a word alignment relationship between each of the n pairs of translation sentences; and
  arrange the translated words to obtain the target language segments.

15. The computer program product of claim 9, wherein each of the target language segments comprises words of k domains, wherein k is a positive integer, and wherein the computer-executable instructions, when executed by a processor, further cause the apparatus to:
  combine words that belong to a same domain and that are in the target language segments to obtain combined words of each domain, wherein the words belonging to the same domain have a same semantic meaning; and
  generalize the combined words of each domain to obtain the extraction rule of the target language.

16. The chip of claim 10, wherein the extraction rule of the target language comprises a plurality of extraction rules corresponding to a plurality of domains, wherein each of the extraction rules is configured to extract words of the target language that have a same semantic meaning, and wherein the circuit is configured to:
  decrease a first generalization degree of a first extraction rule, corresponding to a first domain, in the extraction rule of the target language; and
  increase a second generalization degree of a second extraction rule, corresponding to a second domain, in the extraction rule of the target language.

17. The chip of claim 10, further comprising a circuit configured to generate a date extraction rule, wherein a one-digit or two-digit numeral paired with an English word indicating a particular month is determined to indicate a date.

18. The processing apparatus of claim 11, wherein the at least one circuit is further configured to:
  obtain for each of the n pairs of translation sentences, translated words that are in the target language sentence and that correspond to words comprised in a source language segment extracted from the source language sentence based on a word alignment relationship between each of the n pairs of translation sentences; and arrange the translated words to obtain the target language segments.

19. The processing apparatus of claim 11, wherein the at least one circuit is further configured to:

combine words that belong to a same domain and that are in the target language segments to obtain combined words of each domain, wherein the words belonging to the same domain have a same semantic meaning; and generalize the combined words of each domain to obtain the extraction rule of the target language.

20. The processing apparatus of claim 12, wherein the extraction rule of the target language comprises a plurality of extraction rules corresponding to a plurality of domains, wherein each of the extraction rules is configured to extract words of the target language that have a same semantic meaning, and wherein the instructions cause the processor to be configured to:

decrease a first generalization degree of a first extraction rule, corresponding to a first domain, in the extraction rule of the target language; and increase a second generalization degree of a second extraction rule, corresponding to a second domain, in the extraction rule of the target language.

* * * * *

UNITED STATES PATENT AND TRADEMARK OFFICE
CERTIFICATE OF CORRECTION

| | | |
|---|---|---|
| PATENT NO. | : 11,704,505 B2 | |
| APPLICATION NO. | : 16/907783 | |
| DATED | : July 18, 2023 | |
| INVENTOR(S) | : Chao Xing, Xiao Chen and Zhenlin Cai | |

It is certified that error appears in the above-identified patent and that said Letters Patent is hereby corrected as shown below:

In the Claims

Claim 14, Column 20, Line 28:
"and that correspond to words comprised in a source"
Should read:
"and that correspond to words in a source"

Signed and Sealed this
Twelfth Day of September, 2023

Katherine Kelly Vidal
*Director of the United States Patent and Trademark Office*